United States Patent
Cocchi et al.

(10) Patent No.: US 8,297,434 B2
(45) Date of Patent: Oct. 30, 2012

(54) PRODUCT CONVEYOR UNIT

(75) Inventors: Roberto Cocchi, Medicina (IT); Rodolfo Gaudenzi, Bologna (IT)

(73) Assignee: IMA SAFE S.r.l., Ozzano Emilia (Bologna) (IT)

(*) Notice: Subject to any disclaimer, the term of this patent is extended or adjusted under 35 U.S.C. 154(b) by 66 days.

(21) Appl. No.: 12/991,780

(22) PCT Filed: May 15, 2009

(86) PCT No.: PCT/EP2009/055941
§ 371 (c)(1), (2), (4) Date: Nov. 9, 2010

(87) PCT Pub. No.: WO2009/141283
PCT Pub. Date: Nov. 26, 2009

(65) Prior Publication Data
US 2011/0056802 A1    Mar. 10, 2011

(30) Foreign Application Priority Data
May 20, 2008  (EP) .................................... 08425348

(51) Int. Cl.
*B65G 47/04* (2006.01)
(52) U.S. Cl. ................... 198/481.1; 198/480.1
(58) Field of Classification Search ............... 198/480.1, 198/481.1, 478.1
See application file for complete search history.

(56) References Cited

U.S. PATENT DOCUMENTS

| | | | | |
|---|---|---|---|---|
| 1,375,371 A | * | 4/1921 | Fleischer | 198/481.1 |
| 2,602,531 A | * | 7/1952 | Plank | 198/481.1 |
| 6,523,669 B1 | * | 2/2003 | Steeber et al. | 198/480.1 |

FOREIGN PATENT DOCUMENTS

| | | |
|---|---|---|
| DE | 1117046 B | 11/1961 |
| DE | 1141590 B | 12/1962 |
| DE | 1242508 B | 6/1967 |
| DE | 1281345 B | 10/1968 |
| DE | 1289777 B | 2/1969 |
| DE | 2611354 A1 | 9/1977 |
| DE | 19501650 A1 | 7/1996 |
| DE | 19534498 A1 | 3/1997 |
| FR | 2553308 A | 4/1985 |
| WO | WO2006/137095 A | 12/2006 |

OTHER PUBLICATIONS

International Search Report.

* cited by examiner

*Primary Examiner* — James R Bidwell
(74) *Attorney, Agent, or Firm* — William J. Sapone; Coleman Sudol Sapone P.C.

(57) ABSTRACT

The unit (1) A unit (1) for conveying products (2), in particular blister packs (2), comprises includes a first conveyor (4), and a second conveyor (5). The unit (1) comprises a disc (6) has a disc (6) located between the first conveyor (4) and the second conveyor (5), activatable in rotation about an axis (K) for performing transfer of the products (2) from the first conveyor (4) to the second conveyor (5) and for effecting a change in direction from a change in direction thereof from the first advancement direction (A1) to the to a second advancement direction (A2), and further comprises guide means (8, 80) of the products (2) which guide means. Guides for the products (8, 80) are positionable on the disc (6) such as to identify at least so as to define a linear guide advancement tract (L1) of the for the products (2), thereby aligning for aligning and guiding the products (2) in transfer as they transfer onto the rotating disc (6) and move towards the second conveyor (5).

16 Claims, 5 Drawing Sheets

PRODUCT CONVEYOR UNIT

FIELD OF THE INVENTION

The invention relates to a conveyor unit for products, in particular blister packs.

In particular, the invention is usefully applied in the sector of packing machines, with the aim of transporting blister packs for pharmaceutical articles (for example tablets, capsules, pills etc.) to which the following description will make explicit reference without losing anything in general applicability.

BACKGROUND OF THE INVENTION

In general, in a known packing line the transporting of blister packs, either singly or stacked internally of cardboard boxes and the like, is done by belt conveyors, variously reciprocally arranged to form different advancement directions, for example perpendicular to one another, destined to advance the blister packs in succession along a varied and determined path towards an exit station.

A particularly relevant problem in this technical sector relates to the need to guarantee a correct and predetermined reciprocal alignment among the various blister packs, including following an eventual change in their advancement direction along the transfer path towards the outlet station or a successive operating section of the packing line.

For example, a particularly frequent circumstance relates to the need, according to specific layout requirements, the space available, the constraint of maintaining predetermined environmental conditions (for example sterile packing environments) etc., for the packing line to include the presence of one or more conveyors for connecting the outlet section of a blister-packing machine with the inlet section of a boxing machine which is not aligned with or close to the previous machine.

In this case, the path which the blister packs, in outlet from the blister-packing machine, have to follow before reaching the inlet section of the packing machine can include various changes in direction according to the path imposed by the structure, development and number of the connecting conveyors.

The change in advancement direction of the blister packs during their transfer can determine a reciprocal and random de-alignment with respect to the preferred or predetermined one.

This circumstance constitutes a serious problem in a case in which the various blister packs arrive at the inlet of the boxing machine in an unsuitable configuration for correct and optimal functioning thereof.

A first method used to attempt to obviate the above drawback consists in using conveyors of the slat type, comprising a series of elements hinged to one another such as to be able to take on various reciprocal orientations and to enable the conveyor to follow a conveying path that also includes curved tracts. However it is often found that the packs, following changes of direction imposed thereon by the advancement path, especially as a consequence of the passage through curved tracts thereof, can be de-aligned in a random and de-articulated way.

A further method relates to the use of special conveyors, specially shaped and formed such as to constitute a curved element to be positioned in order to connect two straight consecutive tracts of the advancement path of the packs and exhibiting incident conveyor directions, for example perpendicular. In this case too it has been found that the packs, once they have transited above the shaped curved conveyor, do not stay in a single orientation.

Consequently, in both cases, it has been necessary to use, upstream of the boxing machine, special means or devices for restoring a single orientation of the packs, aligning them to the prefixed reference for a correct and suitable supply to the boxing machine.

Further, both the slat-type conveyors and the profiled conveyors tend to accumulate dust and dirt easily, making cleaning and other hygienic operations difficult; profiled conveyors are also rather noisy.

SUMMARY OF THE INVENTION

The aim of the present invention is to realize a unit for conveying products, in particular blister packs, along a path defined via several conveyors variously arranged and defining different advancement directions, able to guarantee an advancing with a determined and prefixed alignment of the products, i.e. their arrangement with the relative longitudinal axes thereof aligned with one another, including at the points of advancement direction change along the path towards the outlet station.

The set aim is attained in accordance with the contents of the independent claim.

Other advantageous characteristics of the present invention are set out in the corresponding dependent claims.

BRIEF DESCRIPTION OF THE DRAWINGS

The technical characteristics and advantages of the invention, according to the above-mentioned aim, emerge clearly from the description that follows, which is made with reference to the accompanying figures of the drawings, which represent a preferred embodiment of the product conveyor unit, provided purely by way of non-limiting example, in which.

BEST MODES OF CARRYING OUT THE INVENTION

With reference to the accompanying figures of the drawings, 1 denotes in its entirety a product 2 conveyor unit, in particular for blister packs 2 for pharmaceutical articles (e.g. tablets, capsules, pills, etc.).

The conveyor unit 1 of the present invention is specifically though non-limitingly applied to a packing line L of a type comprising a succession of stations/operating machines of known type, and has the task of realising the advancing of blister packs 2 along an advancement path P between one or more of the operating stations.

Figures 1, 1A:
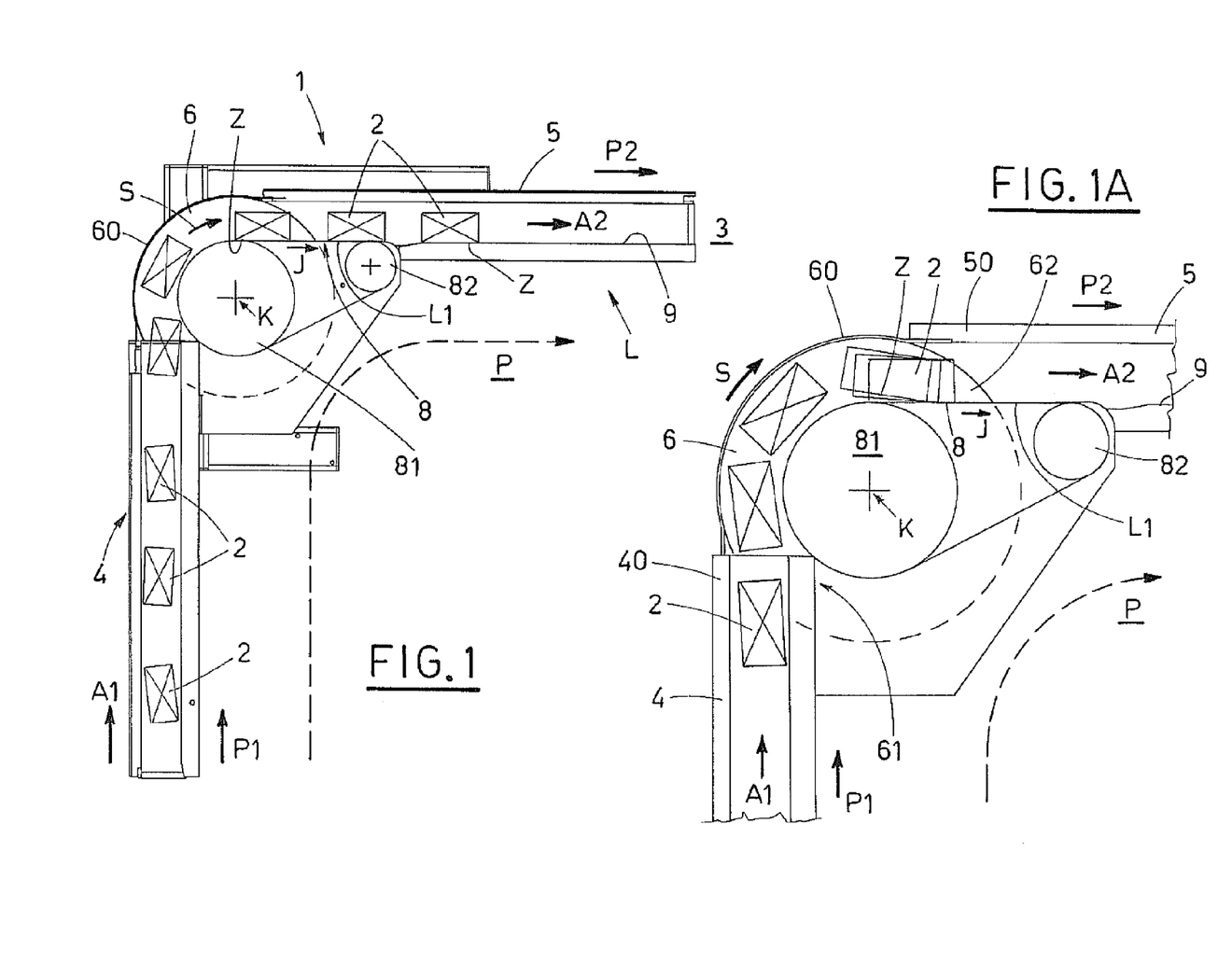
FIG. 1 is a schematic plan view, partially in section and with some parts removed better to observe others, of a first embodiment of the product conveyor unit of the present invention.
FIG. 1A is a schematic plan view in enlarged scale of the conveyor unit of the invention in a first embodiment thereof as in FIG. 1.
Figure 2:
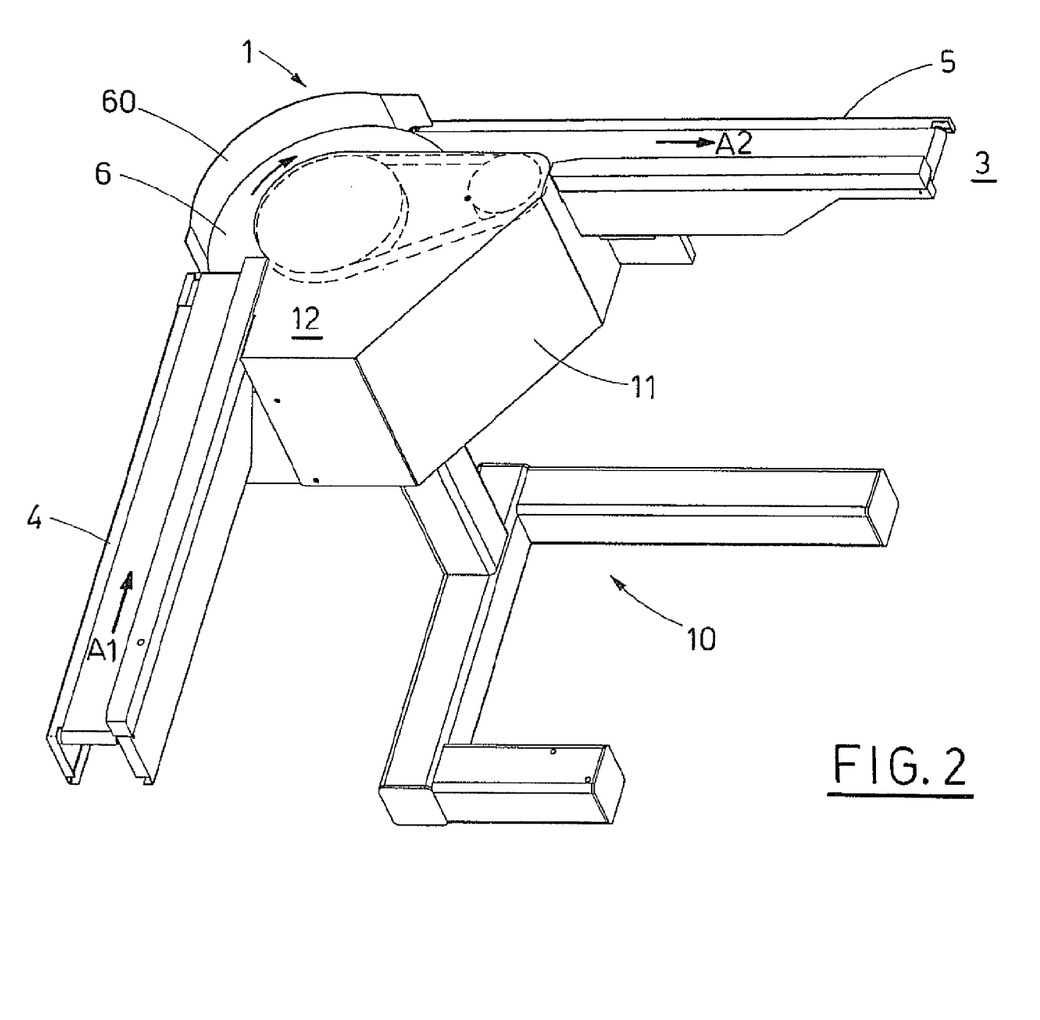
FIG. 2 is a perspective view of the unit of FIG. 1.
Figure 3:
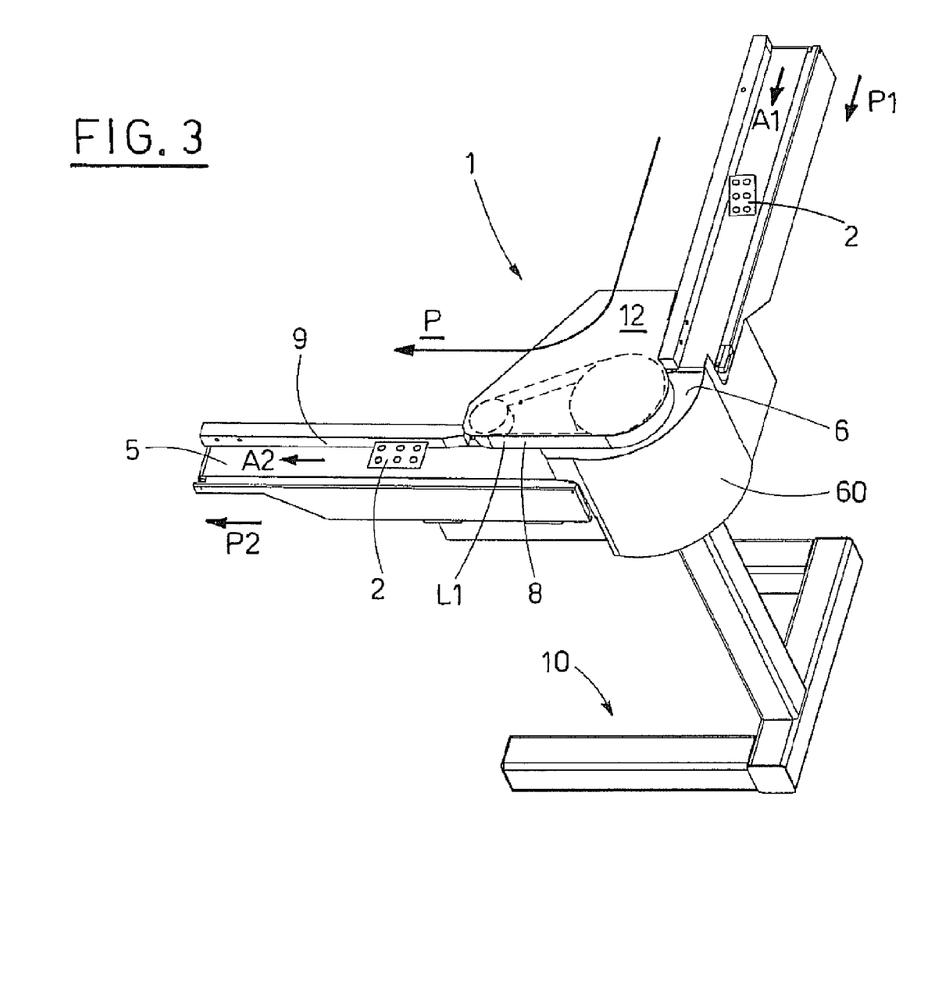
FIG. 3 is the same unit as in FIG. 2, in a further perspective view.

FIGS. 1, 2 and 3 illustrate, for example, the specific use of the conveyor unit 1 of the present invention for advancing blister packs 2 along an advancement path P of the blister packs which is substantially horizontal and exhibits a various orientation towards an operating station denoted by 3, constituting, for example, an outlet station of the blister packs 2 from the packing line L.

The unit 1 of the invention comprises: a first horizontal conveyor 4 (for example a belt conveyor of known type and not illustrated and ring-wound about pulley, also of known type and not illustrated) set to receive the blister packs 2 and to advance them in succession, including non-ordered succession, along a first portion P1 of the path P and in a first advancement direction A1, and a second horizontal conveyor 5 (for example a known-type belt conveyor and not illustrated, ring-wound about pulleys, also of known type and not illustrated), for advancing the blister packs 2 along a second portion P2 of the path P and in a second advancement direction A2 transversal to the first advancement direction A1 towards the operating station 3.

Figure 4:
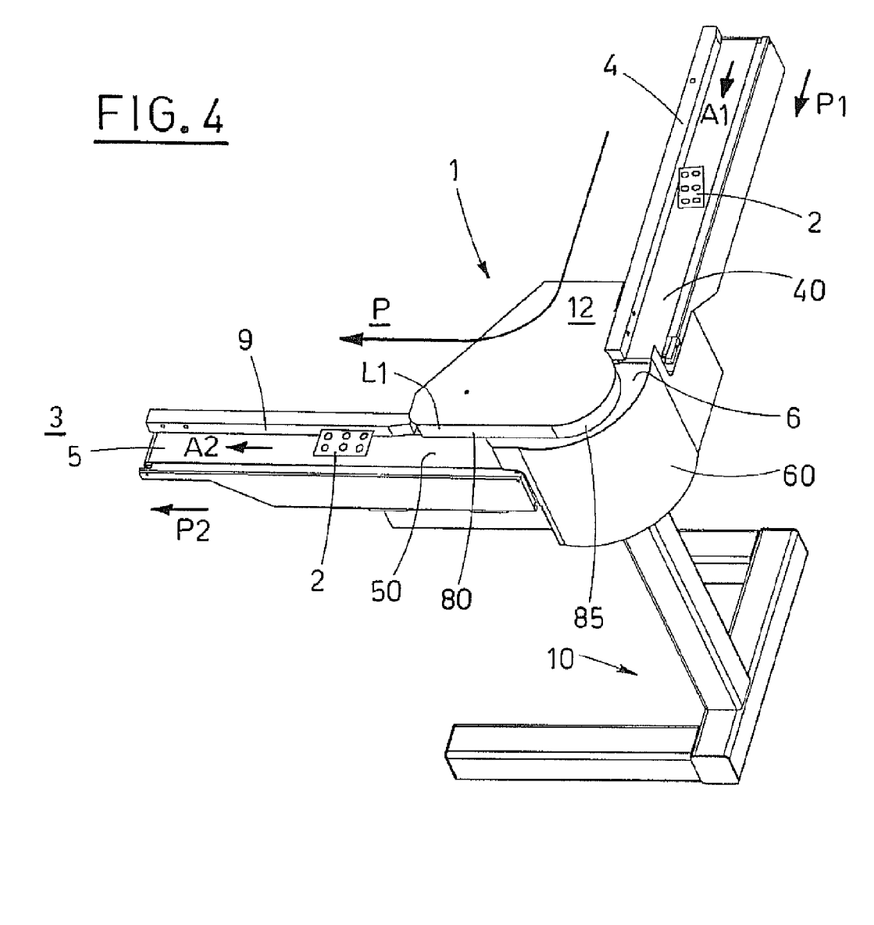
FIG. 4 is a schematic perspective view of a second embodiment of the product conveyor unit according to the present invention.

For example, according to the two non-exclusive forms of the invention illustrated in FIGS. 1, 1A, 2, 3 (first embodiment) and FIG. 4 (second embodiment), the second conveyor 5 is arranged, with respect to the first conveyor 4, such that the second advancement direction A2 is perpendicular to the first advancement direction A1 of the blister packs 2 along the first conveyor 4.

The unit 1 further comprises: a flat disc 6 rotating about a vertical axis K (for example in the clockwise direction S in FIG. 1), which is destined to successively transfer blister packs 2 from the first conveyor 4 to the second conveyor 5, i.e. from the first advancement direction A1 to the second advancement direction A2, and means 8, 80 for guiding the products 2 which are positionable above the disc 6 such as to identify at least a linear guided advancement tract L1 of the products 2 in order to align and guide the products 2 in transfer on the rotating disc 6 towards the second conveyor 5.

In the first embodiment illustrated in FIGS. 1, 1A, 2 and 3, the guide means (8, 80) exhibit a belt 8 which is vertical and advances in the direction indicated by the arrow J in FIG. 1 and in FIG. 1A, and defines, at the initial section 50 of the second conveyor 5, the above-cited linear guided advancement tract L1.

In particular, as is clearly illustrated in FIG. 1A, for example, the belt 8 is small and ring-wound on two vertical-axis activating pulleys, a first pulley 81 and a second pulley 82. The first pulley 81 for example is preferably mounted such that the rotation axis thereof is coaxial with the axis K about which the disc 6 is rotated.

The first pulley 81 and the second pulley 82, in any case, are arranged such that the belt 8 exhibits the above-mentioned linear tract L1 positioned at both the second portion 62 of the disc 6 and at the initial section 50 of the second conveyor 5.

The arrangement of the first pulley 81 and the second pulley 82 about which the belt 8 is wound is advantageously such that the above-mentioned linear tract L1 is perfectly aligned with a vertical guide border 9 of the second conveyor 5.

The alignment of the linear tract L1 of the belt 8 with the vertical guide edge 9 of the second conveyor 5 constitutes the fixed line, i.e. the common prefixed and predetermined orientation to be imposed on all the blister packs 2 advancing along the second conveyor 5 before reaching the operating station 3.

In use, in a combined action with the disc 6, the belt 8 enables maintaining on the second conveyor 5 a movement of the blister packs 2 in a preferred fixed alignment, whatever the orientation, aligned or not aligned, which the single blister packs 2 had during advancement thereof on the first conveyor 4.

As soon as a blister pack 2, after having passed into being supported by the rotating disc 6 and in arrival from the first conveyor 4, enters into contact with the belt 8, the blister pack 2 becomes arranged, thanks to the combined action of the disc 6 and the belt 8, with the longitudinal surface Z thereof turned towards the rotation axis K of the disc 6, all perfectly in contact with the belt 8 along the tract L1 (see FIG. 1 and FIG. 1A) and consequently aligned with the vertical guide border 9 present on the second conveyor 5. The maintaining of the correct aligned movement enables optimal manipulation of the blister packs 2, of vital importance for the following packing stages, for example stacking, insertion in a relative box container, etc.

Advantageously the first pulley 81 activating the belt 8 and consequently the second pulley 82 too can be moved at a rotation speed corresponding to the rotation speed of the disc 6; preferably, in further variants, the first pulley 81 can be activatable at a rotation speed which is greater than the rotation speed of the disc 6.

This enables the various single blister packs 2, once received by the rotating disc 6, released thereon by the final section 40 of the first conveyor 4, to be transferred from the disc 6 in rotation towards the initial section 50 of the second conveyor 5. Before being able to reach the initial section 50 however the single blister packs 2 go into contact with the longitudinal surface Z thereof facing towards the rotation axis K of the disc 6 against the belt 8, at the initial part of the above-cited linear tract L1.

Thus, at this point, the single blister packs 2, being still supported by the rotating disc 6, are subjected contemporaneously to both the rotation action along axis K of the disc 6 and to the linear action of the linear tract L1 of the belt moving in direction J.

Consequently (as shown in FIG. 1A in which the various positions assumed by the blister pack are schematically illustrated) each single blister pack 2, as soon as a portion of the longitudinal surface thereof Z facing towards the axis K reaches contact with the belt 8, in the initial part of the relative linear tract L1, is progressively forced to take on an advancement configuration in which the longitudinal surface Z is arranged completely in contact, and aligned, with the linear tract L1 of the belt 8. The belt 8 thus proceeds to perform the transfer and transport of the thus-orientated blister pack 2 onto the second conveyor 5.

The arrangement of the second pulley 82 about which the belt 8 winds is advantageously such that the final section of the linear tract L1 of the belt 8 is above the initial section 50 of the second conveyor and adjacent to the start of the vertical guide border 9 present in the second conveyor 5 such that the single blister packs 2, once transferred onto the second conveyor 5, maintain the orientation imposed on them by the linear tract L1 of the belt 8.

In the second possible embodiment illustrated in FIG. 4 the guide means (8, 80) comprise at least a fixed straight wall 80 which is vertically positionable above the rotating disc 6; the fixed wall 80 is in fact the above-mentioned linear guided advancement tract L1. The fixed wall 80 is aligned to the second advancement direction A2 of the second conveyor, in particular with a vertical guide border 9 present thereon.

Further, the fixed wall 80 exhibits an extension such as to involve both, on one side, a part of the upper surface of the disc 6 and, on the other side, the initial section 50 of the second conveyor 5. The blister packs 2 transferred and pushed by the rotating disc 6 against the fixed wall 80 are thus subjected to a push with a prevalent component that develops parallel to the fixed wall 80 itself, i.e. parallel to the linear guided advancement tract L1 defined thereby.

The component pushes and guides the blister packs 2 along the fixed wall 80, i.e. along the linear tract L1, aligning them one after another along the fixed wall 80; the blister packs 2 are thus guided, aligned as described above, towards the second conveyor 5.

The unit 1 further comprises base means 10 destined to support the structure 11 which supports the first conveyor 4, the second conveyor 5 and the disc 6 with the relative axis K and drive shaft.

The structure 11, in the case of the first embodiment of claim 1, 1A, 2 and 3, also supports the first pulley 81 and the second pulley 82 on which the belt 8 is wound.

The unit 1 includes casing means 12 which cover the above-mentioned elements, preventing duet from collecting and, especially excluding the possibility of contact with technical personnel working at the unit 1.

The casing means 12, in the case of the second embodiment of FIG. 3, advantageously support the straight fixed wall 80.

In both embodiments there can be the presence of a curved element 60, mountable in proximity of the peripheral surface of the rotating disc 6, between the final section 40 of the first conveyor 4 and the initial section 50 of the second conveyor 5, and facing the portion of the upper surface thereof which conveys the blister packs 2, for containing the blister packs 2 on the disc 6.

In the second embodiment, in order to facilitate the guide of the packs on the disc during the transfer thereof, the conveyor unit can advantageously be provided with a fixed curved wall 85 borne by the casing means 12 and positioned above the disc 6 between the final section 40 of the first conveyor 4 and the straight fixed wall 80, in particular connected with the fixed straight wall 80.

Other characteristics of the conveyor unit of the present invention are as follows.

The disc 6 can be positioned, for example as illustrated in FIGS. 1, 1A, with respect to both the first conveyor 4 and the second conveyor 5, such that a first portion 61 of the upper surface thereof is arranged immediately below the final section 40 of the first conveyor 4, while a second portion 62 of the upper surface is arranged immediately above the initial section 50 of the second conveyor 5. In this regard, preferably both the first conveyor 4 and the second conveyor 5 are constituted by respective belt conveyors which exhibit very narrow and slim winding sections.

The second conveyor 5 can be arranged differently with respect to the first conveyor 4, and the second advancement direction A2 can be orientated in any direction with respect to the first advancement direction A1. Further the rotating disc 6 can be arranged such as to exhibit the external peripheral surface of the first portion 61 directly contiguous to the final section 40 of the first conveyor, and the external peripheral surface of the second portion 62 directly contiguous to the initial section 50 of the second conveyor 5.

The disc 6 is activatable in rotation about the axis K, in the rotation direction S denoted in the figures, preferably with a peripheral speed which is substantially the same as the advancement speed of both the first conveyor 4 and the second conveyor 5, and is turned by a drive shaft connected to the axis K of the disc 6 itself by means of a known connection of a belt type.

In other possible uses, the disc 6 can be activatable in rotation about the axis K at a different speed to the advancement speeds that the first conveyor 4 and the second conveyor 5 are activatable at.

Figure 5:
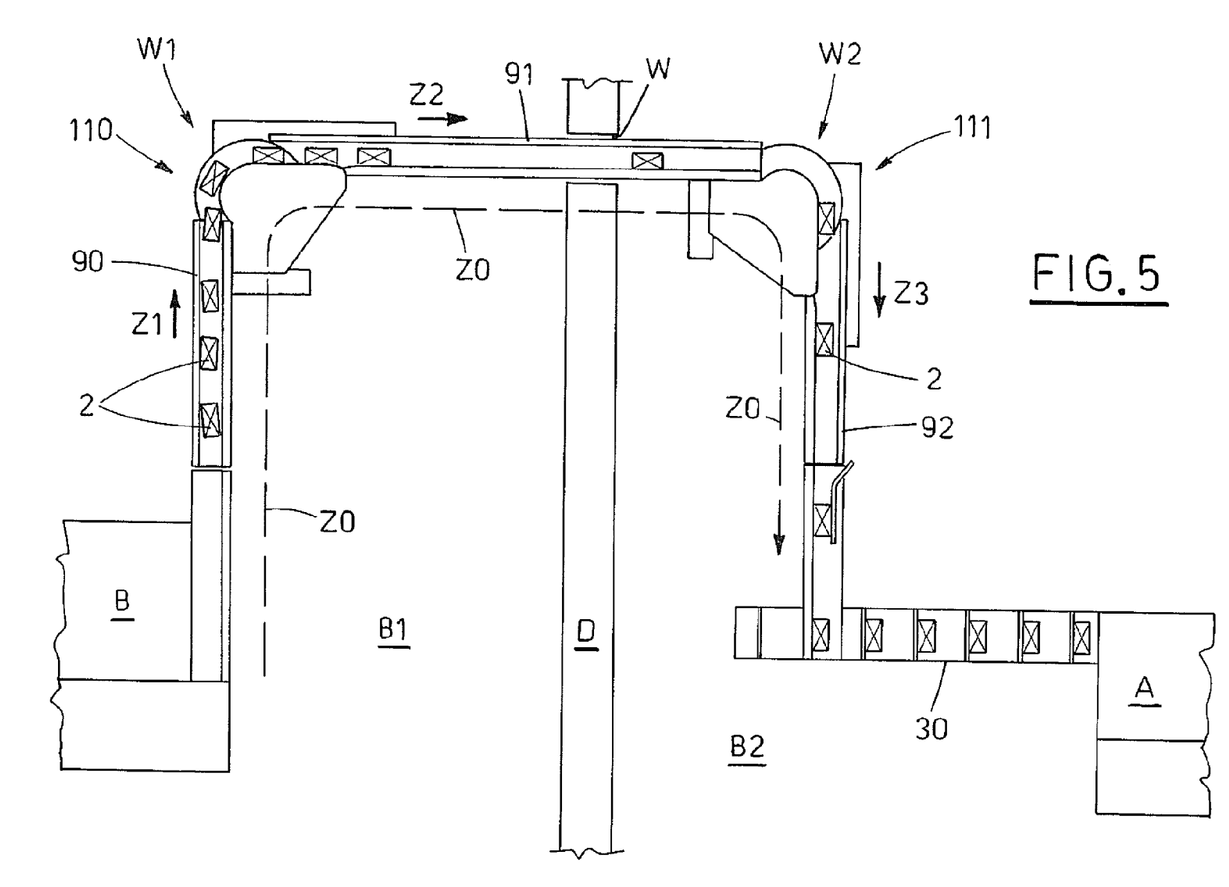
FIG. 5 is a special applicative example of the conveyor unit of the invention, usable for the constituting of an advancement path of the products between the outlet of the blister-packing machine (B) and the inlet of a boxing machine (A) arranged in two distinct environments and separated by a dividing wall (D).

FIG. 5 illustrates an interesting application of a conveyor unit of the present invention.

The use of the conveyor unit of the invention, whether made according to the first embodiment or the second embodiment thereof, is advantageous in the case of a packing line comprising a blister-packing machine B, situated internally of a first environment B1 subjected to a controlled atmosphere (for example sterile), and a boxing machine A situated in a second environment B2 separate from the first environment B1 of a dividing wall D.

In particular, the conveyor unit of the invention is particularly useful and advantageous in a case in which the path Z0 along which the blister packs 2 are to be advanced on exit from the blister-packing machine B comprises changes in the advancement direction thereof in order that the packs can first transit through a connecting passage W between the first environment B1 and the second environment B2 and thus to be able to reach, while maintaining the same reciprocal alignment and predetermined orientation, the inlet of a conveyor 30, for example a compartmentalised conveyor, supplying the boxing machine.

For example, in the embodiment illustrated in FIG. 5, the advancement path Z0, which the blister packs 2 exiting from the blister-packing machine B have to follow, includes three different advancement directions, the first direction Z1, the second direction Z2 and the third direction Z3, and two changes (W1, W2) of the advancement direction.

The first change of direction W1 occurs between the final section of a first conveyor 90, which receives the blister packs 2 exiting from the blister-packing machine B and conveys them in a first advancement direction Z1, and the initial section of a second conveyor 91 for transferring the blister-packs 2 in a second advancement direction Z2 externally of the first environment B1 through the passage W present in the dividing wall D.

The second change of direction W2 occurs between the final section of the second conveyor 91 and the initial section of a third conveyor 92, situated in the second environment B2, for transferring the blister packs 2 in a third advancement direction Z3 up to when they reach and enter the compartmentalised conveyor 30 supplying the boxing machine A.

In such a situation, where two advancement direction changes of the blister packs 2 are comprised, two distinct conveyor units of the invention are advantageously used, each specially provided for performing each of the two changes of direction, ensuring at each advancement direction change that their reciprocal correct alignment is maintained.

In particular, a first conveyor unit 110 of the invention, realised with either the first or the second embodiment as described herein above, can be used for performing the first change of direction W1 between the first conveyor 90 and the second conveyor 91, from the first advancement Z1 to the second advancement direction Z2 of the advancement path Z0, in order to transfer the packs from the first environment B1 to the second environment B2, through the passage W.

A second conveyor unit 11, once more in agreement with the invention, can be used for performing the second change of direction W2 between the second conveyor 91 and the third conveyor 92, from the second advancement direction Z2 to the third advancement direction Z3 of the advancement path Z0, for transferring the packs to the inlet of the box conveyor 30 for supplying the boxing machine A.

In this way, thanks to the presence of the two conveyor units of the invention, the blister packs are at all times guaranteed to remain in a same reciprocal alignment, even after each direction change.

The invention provides in particular the following advantages:

optimal and effective advancement of blister packs along the packing line at connections between various conveyors, even at high production speeds;

the possibility of realising, using one or more conveyor units 1 arranged in succession, a conveyor apparatus for products 2 which is flexible and adaptable to very different production line configurations, while maintaining a desired alignment making the products 2 easy to manage and manipulate in successive stages of treatment/packing.

Further, the special predisposition of the main elements constituting the conveyor unit internally of the casing means 12 saves the unit from a disadvantageous and undesired accumulation of dirt and powder; it is especially easy to clean and to perform hygienic operations upon.

The invention claimed is:

1. A product conveyor unit (1) for conveying blister packs (2) positionable between an outlet of a blister-packing machine (B) and an inlet of a boxing machine (A) comprising:
   a first conveyor (4) receiving blister packs (2) from the outlet of the blister-packing machine (B), the first conveyor conveying the blister packs (2) in a first advancement direction (A1);
   a second conveyor (5) for conveying the blister packs (2) in a second advancement direction (A2) to the inlet of the boxing machine (A), the first conveyor (4) and the second conveyor (5) being reciprocally arranged such that the second advancement direction (A2) is angularly orientated with respect to the first advancement direction (A1), the first conveyor (4) defining a first portion (P1) and the second conveyor (5) defining in turn a second portion (P2) of an advancement path (P) of the blister packs (2),
   a disc (6), positionable between the first conveyor (4) and the second conveyor (5) and being rotatably activatable for transferring the blister packs (2) from the first conveyor (4) to the second conveyor (5) with a consequent change in a direction thereof from the first advancement direction (A1) to the second advancement direction (A2),
   guide means (8, 80) for guiding the blister packs (2), the guide means (8, 80) being positionable on the disc (6) so as to define at least a linear tract (L1) for a guided advancement of the blister packs (2), for aligning and guiding the blister packs (2) during transfer onto the rotating disc (6) and towards the second conveyor (5),
   wherein the outlet of the blister-packing machine (B) is situated in a first environment (B1), and the inlet of the boxing machine (A) is situated in a second environment (B2), separated from the first environment (B1) by means of a dividing wall (D), the dividing wall having a passage (W) for connecting the first environment (B1) to the second environment (B2).

2. The unit of claim 1 wherein the guide means (8, 80) comprise at least one fixed straight wall (80) positionable vertically above the rotating disc (6), the fixed wall (80) defining the linear guided advancement tract (L1).

3. The unit of claim 2 wherein the at least one fixed straight wall (80) is positioned above the disc (6) so that the linear tract (L1) for the guided advancement is aligned to the second advancement direction (A2) of the second conveyor (5).

4. The unit of claim 2 wherein the at least one fixed wall (80) is positioned above the disc (6) so that the linear tract (L1) for the guided advancement is aligned to a vertical guide border (9) located on the second conveyor (5).

5. The unit of claim 2 wherein the at least one fixed wall (80) has an extension so as to encompass, on a first side thereof, a part of an upper surface of the disc (6) and, on a second side thereof, the initial section (50) of the second conveyor (5).

6. The unit of claim 1 wherein the disc (6) is positionable with respect to the first conveyor (4) and with respect to the second conveyor (5) such that a first portion (61) of the upper surface of the disc (6) is arranged immediately below the final section (40) of the first conveyor (4) while a second portion (62) of the upper surface of the disc (6) is arranged immediately above the initial section (50) of the second conveyor (5).

7. The unit of claim 1 wherein the disc (6) is positionable with respect to the first conveyor (4) and with respect to the second conveyor (5) such that a first portion (61) of the upper surface of the disc (6) is arranged contiguously to the final section (40) of the first conveyor (4) while a second portion of the upper surface of the disc (6) is arranged contiguously to the initial section (50) of the second conveyor (5).

8. The unit of claim 1 further comprising a curved element (60) which is mountable in proximity to the peripheral surface of the rotating disc (6), between the final section (40) of the first conveyor (4) and the initial section (50) of the second conveyor (5), and facing the blister packs (2) located on the upper conveyor surface of the disc (6), the curved element (60) containing the blister packs (2) on the disc (6).

9. The unit of claim 2 further comprising a structure (11) for supporting the first conveyor (4), the second conveyor (5), and the rotating disc (6), the structure (11) being borne by base means (10), and further comprising casing means (12) for covering the structure (11), the casing means (12) supporting the at least one fixed straight wall (80).

10. The unit of claim 9 further comprising a fixed curved wall (85) supported by the casing means (12), the fixed curved wall being positioned above the disc (6) between the final section (40) of the first conveyor (4) and the fixed straight wall (80).

11. A product conveyor unit (1) for conveying blister packs (2) positionable between an outlet of a blister-packing machine (B) and an inlet of a boxing machine (A) comprising:
   a first conveyor (4) receiving blister packs (2) from the outlet of the blister-packing machine (B), the first conveyor conveying the blister packs (2) in a first advancement direction (A1);
   a second conveyor (5) for conveying the blister packs (2) in a second advancement direction (A2) to the inlet of the boxing machine (A), the first conveyor (4) and the second conveyor (5) being reciprocally arranged such that the second advancement direction (A2) is angularly orientated with respect to the first advancement direction (A1), the first conveyor (4) defining a first portion (P1) and the second conveyor (5) defining in turn a second portion (P2) of an advancement path (P) of the blister packs (2),
   a disc (6), positionable between the first conveyor (4) and the second conveyor (5) and being rotatably activatable for transferring the blister packs (2) from the first conveyor (4) to the second conveyor (5) with a consequent change in a direction thereof from the first advancement direction (A1) to the second advancement direction (A2), guide means (8, 80) for guiding the blister packs (2), the guide means (8, 80) being positionable on the disc (6) so as to define at least a linear tract (L1) for a guided advancement of the blister packs (2), for aligning and guiding the blister packs (2) during transfer onto the rotating disc (6) and towards the second conveyor (5), wherein the guide means (8, 80) comprise a belt (8) which is ring-wound about two activating pulleys, a first pulley (81) and a second pulley (82), the first pulley (81) and the second pulley (82) being arranged such that the belt (8) is positioned vertically above the disc (6) in order to define the linear tract (L1) for the guided advancement, the belt (8) being activatable by the first pulley (81) and the second pulley (82) so as to advance in an advancement direction (J) towards the second conveyor (5).

12. The unit of claim 11 wherein the first pulley (81) and the second pulley (82) are arranged so that the belt (8) provides the linear tract (L1) for guided advancement vertically above the disc (6) and at an initial section (50) of the second conveyor (5), being aligned to a vertical guide border (9) present on the second conveyor (5).

13. The unit of claim 11 wherein the disc (6) is rotatably activatable by a drive organ for rotation of the disc about a rotation axis (K), the first pulley (81) having a rotation axis which is coaxial with the axis (K).

14. The unit of claim 13 wherein the first pulley (81) is rotatably activatable for rotation at a velocity which is at least equal to a rotation velocity of the disc (6) about the axis (K).

15. The unit of claim 11 further comprising a structure (11) for supporting the first conveyor (4), the second conveyor (5), the rotating disc (6), the belt (8)with the first pulley (81) and the second pulley (82), the structure (11) being borne by base means (10), and further comprising casing means (12) for covering the structure (11).

16. The unit of claim 11 wherein the outlet of the blister-packing machine (B) is situated in a first environment (B1), and the inlet of the boxing machine (A) is situated in a second environment (B2), separated from the first environment (B1) by means of a dividing wall (D), the dividing wall having a passage (W) for connecting the first environment (B1) to the second environment (B2).

* * * * *